(12) United States Patent
Furcoiu

(10) Patent No.: US 11,193,609 B2
(45) Date of Patent: Dec. 7, 2021

(54) PIPE COUPLING

(71) Applicant: Mueller International, LLC, Atlanta, GA (US)

(72) Inventor: Aurelian Ioan Furcoiu, Chattanooga, TN (US)

(73) Assignee: Mueller International, LLC, Atlanta, GA (US)

(*) Notice: Subject to any disclaimer, the term of this patent is extended or adjusted under 35 U.S.C. 154(b) by 606 days.

(21) Appl. No.: 15/908,096

(22) Filed: Feb. 28, 2018

(65) Prior Publication Data

US 2019/0264843 A1 Aug. 29, 2019

(51) Int. Cl.
*F16L 17/03* (2006.01)
*F16L 21/02* (2006.01)
*F16L 21/03* (2006.01)

(52) U.S. Cl.
CPC ........... *F16L 17/032* (2013.01); *F16L 21/022* (2013.01); *F16L 21/03* (2013.01)

(58) Field of Classification Search
CPC ......... F16L 17/02; F16L 17/025; F16L 17/03; F16L 17/032
USPC ................................................. 285/110, 111
See application file for complete search history.

(56) References Cited

U.S. PATENT DOCUMENTS

| | | | | |
|---|---|---|---|---|
| 1,945,293 A | * | 1/1934 | Pierce | F16L 17/035 277/625 |
| 1,964,044 A | | 6/1934 | Engel | |
| 2,355,407 A | * | 8/1944 | Wyss | F16L 37/54 285/6 |
| 2,394,351 A | | 2/1946 | Wurzburger | |
| 2,693,374 A | | 11/1954 | Wurzburger | |
| 2,887,328 A | * | 5/1959 | Risley | F16L 21/04 277/625 |
| 3,081,102 A | * | 3/1963 | Murray | F16L 17/025 277/607 |
| 3,150,876 A | * | 9/1964 | Lafferty | F16L 17/025 277/603 |
| 3,162,469 A | * | 12/1964 | Shohan | F16L 27/12 285/5 |
| 3,163,432 A | * | 12/1964 | De Boer | F16L 17/025 277/602 |

(Continued)

FOREIGN PATENT DOCUMENTS

| | | |
|---|---|---|
| CA | 2458710 | 8/2005 |
| CA | 2458788 | 8/2005 |

(Continued)

OTHER PUBLICATIONS

Furcoiu, Aurelian Ioan; Non-Final Office Action for U.S. Appl. No. 15/490,926, filed Apr. 19, 2017, dated Mar. 14, 2019, 30 pgs.

(Continued)

*Primary Examiner* — David Bochna
(74) *Attorney, Agent, or Firm* — Taylor English Duma LLP

(57) ABSTRACT

A piping element assembly includes a coupling body and at least one gasket, the coupling body defining an interior cavity, the interior cavity in contact with the at least one gasket, the piping element assembly adapted for sealably connecting two lengths of pipe by insertion of the pipe lengths within the interior cavity and sealed by the at least one gasket.

17 Claims, 10 Drawing Sheets

(56) References Cited

U.S. PATENT DOCUMENTS

| | | | |
|---|---|---|---|
| 3,179,446 A * | 4/1965 | Paterson | F16L 17/035 |
| | | | 277/620 |
| 3,186,741 A * | 6/1965 | Kurtz | F16L 17/035 |
| | | | 285/111 |
| 3,211,472 A | 10/1965 | Rickard | |
| 3,249,371 A | 3/1966 | Peterman | |
| 3,252,192 A | 5/1966 | Smith | |
| 3,315,970 A * | 4/1967 | Holoway | F16L 17/035 |
| | | | 277/615 |
| 3,315,971 A * | 4/1967 | Sakurada | F16L 17/032 |
| | | | 277/615 |
| 3,414,273 A * | 12/1968 | Sumner | F16L 17/025 |
| | | | 277/626 |
| 3,432,190 A | 3/1969 | Kunz | |
| 3,485,515 A * | 12/1969 | Frishof | F16L 21/08 |
| | | | 285/5 |
| 3,573,871 A * | 4/1971 | Warner | F16L 17/025 |
| | | | 277/607 |
| 3,642,306 A * | 2/1972 | Gheen | F16L 27/12 |
| | | | 285/5 |
| 3,653,695 A | 4/1972 | Dunton et al. | |
| 3,680,874 A * | 8/1972 | Schwarz | F16L 27/127 |
| | | | 277/618 |
| 3,684,317 A * | 8/1972 | Kazienko | F16L 47/08 |
| | | | 285/110 |
| 3,698,744 A * | 10/1972 | Bevington | F16L 37/252 |
| | | | 285/111 |
| 3,877,733 A * | 4/1975 | Straub | F16L 21/08 |
| | | | 285/105 |
| 3,980,097 A | 9/1976 | Ellis | |
| 4,092,036 A | 5/1978 | Sato et al. | |
| 4,380,348 A | 4/1983 | Swartz | |
| 4,397,485 A * | 8/1983 | Wood | F16L 17/025 |
| | | | 285/111 |
| 4,410,479 A * | 10/1983 | Cyriax | F16L 47/08 |
| | | | 264/255 |
| 4,522,434 A | 6/1985 | Webb | |
| 4,538,841 A | 9/1985 | Royston | |
| 4,544,188 A | 10/1985 | Dugger | |
| 4,568,112 A | 2/1986 | Bradley, Jr. et al. | |
| 4,569,542 A | 2/1986 | Anderson et al. | |
| 4,609,210 A | 9/1986 | Torokvei et al. | |
| 4,629,176 A | 12/1986 | Ceelen | |
| 4,664,426 A | 5/1987 | Ueki | |
| 4,741,356 A | 5/1988 | Letzo et al. | |
| 4,768,813 A | 9/1988 | Timmons | |
| 4,779,900 A | 10/1988 | Shumard | |
| 4,791,952 A | 12/1988 | Laurel | |
| 4,848,808 A | 7/1989 | Pannell et al. | |
| 4,858,968 A | 8/1989 | Moebius | |
| 4,890,967 A | 1/1990 | Rosenbaum | |
| 5,069,490 A | 12/1991 | Halen, Jr. | |
| 5,071,175 A | 12/1991 | Kennedy, Jr. | |
| 5,121,946 A | 6/1992 | Jardine | |
| 5,205,568 A | 4/1993 | Stoll et al. | |
| 5,232,252 A * | 8/1993 | Bartholomew | F16L 37/0987 |
| | | | 285/108 |
| 5,297,826 A | 3/1994 | Percebois et al. | |
| 5,324,083 A * | 6/1994 | Vogelsang | F16L 17/035 |
| | | | 285/110 |
| 5,335,946 A | 8/1994 | Dent et al. | |
| 5,398,980 A | 3/1995 | Hunter | |
| 5,437,481 A | 8/1995 | Spears et al. | |
| 5,468,025 A | 11/1995 | Adinolfe et al. | |
| 5,476,292 A | 12/1995 | Harper | |
| 5,498,042 A | 3/1996 | Dole | |
| 5,505,499 A | 4/1996 | Wallbank | |
| 5,544,922 A | 8/1996 | Shumard et al. | |
| 5,803,110 A | 9/1998 | Segal | |
| 5,851,037 A | 12/1998 | Bridges | |
| 5,941,576 A * | 8/1999 | Krausz | F16L 17/04 |
| | | | 285/110 |
| 6,106,029 A | 8/2000 | Demore et al. | |
| 6,173,993 B1 | 1/2001 | Shumard et al. | |
| 6,273,469 B1 | 8/2001 | Kwaske et al. | |
| 6,364,372 B1 | 4/2002 | Marandi | |
| 6,457,718 B1 | 10/2002 | Quesada | |
| 6,481,762 B1 * | 11/2002 | Rex | F16L 17/025 |
| | | | 285/104 |
| 6,830,268 B2 | 12/2004 | Krausz | |
| 7,232,160 B2 | 6/2007 | Krausz | |
| 7,243,955 B2 * | 7/2007 | Krausz | F16L 21/08 |
| | | | 285/236 |
| 7,469,939 B2 | 12/2008 | Westman et al. | |
| 7,571,940 B2 | 8/2009 | Krausz | |
| D602,127 S | 10/2009 | Shah et al. | |
| 7,625,018 B2 | 12/2009 | Krausz | |
| 7,654,586 B2 | 2/2010 | Krausz | |
| 7,748,753 B2 | 7/2010 | Krausz | |
| 7,837,238 B2 | 11/2010 | Krausz | |
| 7,883,126 B2 | 2/2011 | Terry et al. | |
| 7,997,626 B2 | 8/2011 | Krausz | |
| 7,997,628 B1 | 8/2011 | Smith, Jr. | |
| 8,042,816 B2 | 10/2011 | Krausz | |
| 8,313,124 B2 | 11/2012 | Krausz | |
| 8,408,606 B2 | 4/2013 | Krausz | |
| 8,651,530 B2 | 2/2014 | Krausz | |
| 8,857,861 B2 | 10/2014 | German | |
| 8,870,189 B2 | 10/2014 | Krausz | |
| 8,960,683 B2 * | 2/2015 | Krausz | F16L 25/14 |
| | | | 277/605 |
| 8,960,729 B2 | 2/2015 | Chiproot | |
| D724,185 S | 3/2015 | Chiproot | |
| 9,086,177 B2 | 7/2015 | Artsiely | |
| 9,109,701 B1 * | 8/2015 | Copeland | F16J 15/122 |
| 9,163,760 B2 | 10/2015 | Lundstrom et al. | |
| 9,441,771 B2 * | 9/2016 | German | F16L 21/007 |
| 9,890,883 B2 * | 2/2018 | Maenishi | F16L 21/08 |
| 10,107,428 B2 | 10/2018 | Kim | |
| 10,677,381 B2 | 6/2020 | Furcoiu | |
| 10,774,508 B2 | 9/2020 | Furcoiu et al. | |
| 10,851,920 B2 * | 12/2020 | Showkathali | F16L 21/08 |
| 10,941,887 B2 | 3/2021 | Furcoiu | |
| 11,131,412 B2 | 9/2021 | Furcoiu | |
| 2002/0017789 A1 | 2/2002 | Holmes | |
| 2002/0037194 A1 | 3/2002 | Gentile | |
| 2003/0085566 A1 | 5/2003 | Rex et al. | |
| 2004/0108713 A1 | 6/2004 | Krausz | |
| 2004/0232698 A1 | 11/2004 | Jones | |
| 2005/0194784 A1 | 9/2005 | Jones et al. | |
| 2005/0253380 A1 | 11/2005 | Gibb et al. | |
| 2006/0012172 A1 | 1/2006 | Kennedy, Jr. | |
| 2006/0087121 A1 | 4/2006 | Bradley | |
| 2007/0108766 A1 | 5/2007 | Riordan et al. | |
| 2007/0295406 A1 | 12/2007 | German et al. | |
| 2009/0243289 A1 | 10/2009 | Madara et al. | |
| 2010/0289256 A1 | 11/2010 | Shumard | |
| 2011/0084484 A1 | 4/2011 | German et al. | |
| 2011/0095519 A1 | 4/2011 | Krausz | |
| 2011/0291409 A1 | 12/2011 | Kennedy, Jr. et al. | |
| 2012/0025524 A1 | 2/2012 | Krausz | |
| 2012/0119485 A1 | 5/2012 | Cichorek et al. | |
| 2012/0299294 A1 | 11/2012 | Chiproot | |
| 2012/0299295 A1 | 11/2012 | Chiproot | |
| 2013/0056980 A1 | 3/2013 | Chiproot | |
| 2013/0328305 A1 | 12/2013 | Chiproot | |
| 2014/0001709 A1 | 1/2014 | Chiproot | |
| 2014/0319781 A1 | 10/2014 | Chiproot | |
| 2014/0319826 A1 | 10/2014 | Chiproot | |
| 2015/0176728 A1 | 6/2015 | Bowman | |
| 2015/0204468 A1 * | 7/2015 | Jones | F16L 17/035 |
| | | | 285/110 |
| 2017/0030489 A1 | 2/2017 | Decesare et al. | |
| 2017/0114933 A1 * | 4/2017 | Copeland | F16L 21/03 |
| 2017/0130431 A1 | 5/2017 | Pinney et al. | |
| 2018/0306354 A1 | 10/2018 | Furcoiu | |
| 2018/0306361 A1 | 10/2018 | Furcoiu | |
| 2018/0306362 A1 | 10/2018 | Furcoiu | |
| 2019/0017636 A1 | 1/2019 | Furcoiu | |
| 2019/0145565 A1 | 5/2019 | Furcoiu | |
| 2019/0331265 A1 | 10/2019 | Bowman | |
| 2020/0025321 A1 | 1/2020 | Furcoiu | |

(56) References Cited

U.S. PATENT DOCUMENTS

| | | |
|---|---|---|
| 2020/0063900 A1 | 2/2020 | Furcoiu |
| 2020/0071915 A1 | 3/2020 | Furcoiu et al. |
| 2020/0248847 A1 | 8/2020 | Furcoiu |
| 2020/0263814 A1 | 8/2020 | Furcoiu |
| 2020/0354930 A1 | 11/2020 | Furcoiu et al. |
| 2021/0018125 A1 | 1/2021 | Mitchell et al. |
| 2021/0102647 A1 | 4/2021 | Furcoiu |
| 2021/0324980 A1 | 10/2021 | Furcoiu |

FOREIGN PATENT DOCUMENTS

| | | |
|---|---|---|
| CA | 2944828 | 11/2015 |
| CN | 1894531 | 1/2007 |
| CN | 202168185 | 3/2012 |
| DE | 19837803 | 3/2000 |
| DE | 202016100359 | 3/2016 |
| EP | 0273999 | 7/1988 |
| EP | 2463567 | 6/2012 |
| EP | 2494249 | 9/2012 |
| GB | 1311434 | 3/1973 |
| GR | 3030125 | 7/1999 |
| IL | 196511 | 1/2009 |
| IL | 196817 | 2/2009 |
| IL | 209936 | 12/2010 |
| KR | 101418783 | 7/2014 |
| KR | 20160082923 | 7/2016 |
| WO | 2004048835 | 6/2004 |
| WO | 2011123865 | 10/2011 |
| WO | 2016108517 | 7/2016 |
| WO | 2018194787 | 10/2018 |
| WO | 2019212771 | 11/2019 |
| WO | 2020040995 | 2/2020 |
| WO | 2020050954 | 3/2020 |
| WO | 2020146073 | 7/2020 |
| WO | 2021015809 | 1/2021 |

OTHER PUBLICATIONS

Mueller International, LLC; Presentation which includes descriptions and images of known restraint devices. The restraint devices were publicly available prior to Apr. 19, 2017, 39 pgs.

Furcoiu, Aurelian Ioan; Supplemental Notice of Allowance for U.S. Appl. No. 15/490,926, filed Jan. 19, 2017, dated Mar. 12, 2020, 9 pgs.

Furcoiu, Aurelian Ioan; Non-Final Office Action for U.S. Appl. No. 15/966,796, filed Apr. 20, 2018, dated Feb. 24, 2020, 40 pgs.

Furcoiu, Aurelian Ioan; Final Office Action for U.S. Appl. No. 16/121,132, filed Sep. 4, 2018, dated Jan. 20, 2020, 17 pgs.

Furcoiu, Aurelian Ioan; International Search Report and Written Opinion for PCT Application No. PCT/US19/65201, filed Dec. 9, 2019, dated Feb. 24, 2020, 10 pgs.

Furcoiu, Aurelian Ioan; Requirement for Restriction/Election for U.S. Appl. No. 15/490,926, filed Jan. 19, 2017, dated Jul. 1, 2019, 9 pgs.

Furcoiu, Aurelian Ioan; Requirement for Restriction/Election for U.S. Appl. No. 15/882,512, filed Jan. 29, 2018, dated Jul. 25, 2019, 8 pgs.

Furcoiu, Aurelian Ioan; International Search Report and Written Opinion for PCT Application No. PCT/US19/28339, filed Apr. 19, 2019, dated Jun. 26, 2019, 8 pgs.

Furcoiu, Aurelian Ioan; Requirement for Restriction/Election for U.S. Appl. No. 15/966,796, filed Jan. 30, 2018, dated Sep. 27, 2019, 8 pgs.

Furcoiu, Aurelian Ioan; Non-Final Office Action for U.S. Appl. No. 16/121,132, filed Sep. 4, 2018, dated Nov. 12, 2019, 31 pgs.

Furcoiu, Aurelian Ioan; International Preliminary Report on Patentability for PCT Application No. PCT/US18/23554, filed Mar. 21, 2018, dated Oct. 31, 2019, 8 pgs.

Furcoiu, Aurelian Ioan; Invitation to Pay Additional Fees for PCT/US19/46085, filed Aug. 12, 2019, dated Oct. 9, 2019, 2 pgs.

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; Notice of Allowance for U.S. Appl. No. 15/490,926, filed Apr. 19, 2017, dated Feb. 12, 2020, 15 pgs.

Furcoiu, Aurelian Ioan; Non-Final Office Action for U.S. Appl. No. 15/882,512, filed Jan. 29, 2018, dated Dec. 12, 2019, 42 pgs.

Furcoiu, Aurelian Ioan; International Search Report and Written Opinion for PCT Application No. PCT/US19/46085, filed Aug. 12, 2019, dated Dec. 11, 2019, 13 pgs.

Mitchell, Timothy J.; International Search Report and Written Opinion for PCT Application No. PCT/US19/65337, filed Dec. 10, 2019, dated Feb. 5, 2020, 9 pgs.

Furcoiu, Aurelian Ioan; International Search Report for PCT Application No. PCT/US18/23554, filed Mar. 21, 2018, dated Jun. 6, 2018, 10 pgs.

Furcoiu, Aurelian Ioan; Notice of Allowance for U.S. Appl. No. 15/649,022, filed Jul. 13, 2017, dated Oct. 1, 2020, 16 pgs.

Furcoiu, Aurelian Ioan; Non-Final Office Action for U.S. Appl. No. 15/966,796, filed Apr. 30, 2018, dated Sep. 3, 2020, 19 pgs.

Furcoiu, Aurelian Ioan; Corrected Notice of Allowance for U.S. Appl. No. 16/121,132, filed Sep. 4, 2018, dated Aug. 12, 2020, 8 pgs.

Furcoiu, Aurelian Ioan; Supplemental Notice of Allowance for U.S. Appl. No. 15/490,926, filed Apr. 19, 2017, dated May 14, 2020, 7 pgs.

Furcoiu, Aurelian Ioan; Non-Final Office Action for U.S. Appl. No. 15/882,512, filed Jan. 29, 2018, dated Jun. 26, 2020, 20 pgs.

Furcoiu, Aurelian Ioan; Non-Final Office Action for U.S. Appl. No. 15/649,022, filed Jul. 13, 2017, dated Jun. 25, 2020, 55 pgs.

Furcoiu, Aurelian Ioan; Requirement for Restriction/Election for U.S. Appl. No. 15/649,022, filed Jul. 13, 2017, dated May 19, 2020, 6 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; Non-Final Office Action for U.S. Appl. No. 16/242,059, filed Jan. 8, 2019, dated Nov. 20, 2020, 52 pgs.

Furcoiu, Aurelian Ioan; Corrected Notice of Allowance for U.S. Appl. No. 15/649,022, filed Jul. 13, 2017, dated Jan. 1, 2021, 8 pgs.

Furcoiu, Aurelian Ioan; Corrected Notice of Allowance for U.S. Appl. No. 15/649,022, filed Jul. 13, 2017, dated Nov. 12, 2020, 7 pgs.

Furcoiu, Aurelian Ioan; Corrected Notice of Allowance for U.S. Appl. No. 15/649,022, filed Jul. 13, 2017, dated Nov. 16, 2020, 9 pgs.

Furcoiu, Aurelian Ioan; Notice of Allowance for U.S. Appl. No. 15/649,022, filed Jul. 13, 2017, dated Dec. 9, 2020, 9 pgs.

Furcoiu, Aurelian Ioan; Non-Final Office Action for U.S. Appl. No. 16/109,204, filed Aug. 22, 2018, dated Dec. 22, 2020, 65 pgs.

Furcoiu, Aurelian Ioan; Requirement for Restriction/Election for U.S. Appl. No. 16/109,204, filed Mar. 22, 2018, dated Oct. 27, 2020, 6 pgs.

Furcoiu, Aurelian Ioan; Office Action for European patent application No. 18787054.8, filed Mar. 21, 2018, dated Dec. 22, 2020, 3 pgs.

Furcoiu, Aurelian Ioan; International Preliminary Report on Patentability for PCT Application No. PCT/US19/28339, filed Apr. 19, 2019, dated Nov. 12, 2020, 7 pgs.

Furcoiu, Aurelian Ioan; Non-Final Office Action for U.S. Appl. No. 16/575,013, filed Sep. 18, 2019, dated Mar. 10, 2021, 55 pgs.

Furcoiu, Aurelian Ioan; Corrected Notice of Allowance for U.S. Appl. No. 15/649,022, filed Jul. 13, 2017, dated Feb. 3, 2021, 7 pgs.

Furcoiu, Aurelian Ioan; Notice of Allowance for U.S. Appl. No. 15/966,796, filed Apr. 30, 2018, dated Mar. 26, 2021, 26 pgs.

Furcoiu, Aurelian Ioan; Non-Final Office Action for U.S. Appl. No. 16/266,835, filed Feb. 4, 2019, dated Mar. 24, 2021, 62 pgs.

Furcoiu, Aurelian Ioan; Requirement for Restriction/Election for U.S. Appl. No. 16/266,835, filed Feb. 4, 2019, dated Feb. 22, 2021, 6 pgs.

Furcoiu, Aurelian Ioan; International Preliminary Report on Patentability for PCT Application No. PCT/US19/46085, filed Aug. 12, 2019, dated Mar. 18, 2021, 10 pgs.

(56) References Cited

OTHER PUBLICATIONS

Furcoiu, Aurelian Ioan; International Preliminary Report on Patentability for PCT Application No. PCT/US19/45453, filed Aug. 7, 2019, dated Mar. 4, 2021, 8 pgs.

Furcoiu, Aurelian Ioan; Final Office Action for U.S. Appl. No. 15/882,512, filed Jan. 29, 2018, dated Jan. 28, 2021, 20 pgs.

Furcoiu, Aurelian Ioan; Office Action for Chinese patent application No. 201880026432.6, file Mar. 21, 2018, dated Nov. 4, 2020, 13 pgs.

Furcoiu, Aurelian Ioan; Notice of Allowance for U.S. Appl. No. 15/882,512, filed Jan. 29, 2018, dated May 24, 2021, 23 pgs.

Furcoiu, Aurelian Ioan; Final Office Action for U.S. Appl. No. 16/575,013, filed Sep. 18, 2019, dated Jun. 17, 2021, 15 pgs.

Furcoiu, Aurelian Ioan; Final Office Action for U.S. Appl. No. 16/242,059, filed Jan. 8, 2019, dated Jun. 11, 2021, 24 pgs.

Furcoiu, Aurelian Ioan; Supplemental Notice of Allowance for U.S. Appl. No. 15/966,796, filed Apr. 30, 2018, dated May 19, 2021, 6 pgs.

Furcoiu, Aurelian Ioan; Supplemental Notice of Allowance for U.S. Appl. No. 15/966,796, filed Apr. 30, 2018, dated Aug. 3, 2021, 7 pgs.

Furcoiu, Aurelian Ioan; Final Office Action for U.S. Appl. No. 16/109,204, filed Aug. 22, 2018, dated Jun. 14, 2021, 22 pgs.

Furcoiu, Aurelian Ioan; Notice of Allowance for U.S. Appl. No. 16/266,835, filed Feb. 4, 2019, dated Jul. 2, 2021, 11 pgs.

Furcoiu, Aurelian Ioan; International Preliminary Report on Patentability for PCT Application No. PCT/US19/65201, filed Dec. 9, 2019, dated Jul. 22, 2021, 9 pgs.

Furcoiu, Aurelian Ioan; Office Action for Chinese patent application No. 201880026432.6, file Mar. 21, 2018, dated May 28, 2021, 18 pgs.

Furcoiu, Aurelian Ioan; Non-Final Office Action for U.S. Appl. No. 16/854,369, filed Apr. 21, 2020, dated Sep. 22, 2021, 51 pgs.

Furcoiu, Aurelian Ioan; Supplemental Notice of Allowance for U.S. Appl. No. 15/882,512, filed Jan. 29, 2018, dated Sep. 1, 2021, 11 pgs.

Furcoiu, Aurelian Ioan; Notice of Allowance for U.S. Appl. No. 16/242,059, filed Jan. 8, 2019, dated Mar. 13, 2021, 18 pgs.

Furcoiu, Aurelian Ioan; Supplemental Notice of Allowance for U.S. Appl. No. 16/242,059, filed Jan. 8, 2019, dated Sep. 1, 2021, 7 pgs.

Furcoiu, Aurelian Ioan; Non-Final Office Action for U.S. Appl. No. 16/942,996, filed Jul. 30, 2020, dated Sep. 29, 2021, 44 pgs.

Furcoiu, Aurelian Ioan; Advisory Action for U.S. Appl. No. 16/109,204, filed Aug. 22, 2018, dated Mar. 19, 2021, 10 pgs.

Furcoiu, Aurelian Ioan; Non-Final Office Action for U.S. Appl. No. 16/109,204, filed Aug. 22, 2018, dated Sep. 23, 2021, 19 pgs.

Furcoiu, Aurelian Ioan; Supplemental Notice of Allowance for U.S. Appl. No. 16/266,835, filed Feb. 4, 2019, dated Oct. 6, 2021, 7 pgs.

Furcoiu, Aurelian Ioan; Supplemental Notice of Allowance for U.S. Appl. No. 16/266,835, filed Feb. 4, 2019, dated Aug. 17, 2021, 7 pgs.

Furcoiu, Aurelian Ioan; Extended European Search Report for patent application No. 18787054.8, filed Mar. 21, 2018, dated Mar. 17, 2021 (received by European counsel for Applicant on Aug. 20, 2021), 9 pgs.

\* cited by examiner

PIPE COUPLING

TECHNICAL FIELD

This disclosure relates to piping. More specifically, this disclosure relates to joining piping elements.

BACKGROUND

Municipal piping systems often can include piping lines of various sizes. Even with respect to a measurement—for example, diameter of piping—industry standards can vary depending on the material used. For example, ductile iron piping can be measured to have a different diameter from steel piping, and steel piping can be measured to have a different diameter from polyvinyl chloride (PVC) piping, even if all the different piping materials are within the same piping diameter class. As such, piping elements can often be directed only toward one piping material. Additionally, different piping materials can have different manufacturing tolerances, further complicating the design of attachments for said municipal piping supplies.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A slip-on piping element assembly for coupling two pipe lengths includes a coupling body, the coupling body comprising an outer shell extending between a first end and a second end of the coupling body, the outer shell defining an axial direction extending from the first end to the second end and a radial direction extending orthogonally from the axial direction, an inner shell defining an interior cavity, a first bore defined in the first end and communicating with the interior cavity, and a second bore defined in the second end and communicating with the interior cavity; at least one gasket disposed within the interior cavity, each gasket comprising a gasket shoulder contacting the inner shell of the coupling body, an annular sealing ring including a sealing surface disposed radially inward on the annular sealing ring and adapted to seal against an outer surface of one pipe length, and a connecting portion connecting the gasket shoulder to the annular ring, wherein the annular sealing ring, the connecting portion, and the gasket shoulder define a channel, the channel in fluid communication with the interior cavity.

A gasket includes a gasket shoulder, the gasket shoulder defining a radial gasket end; an annular sealing ring defining a sealing surface disposed radially inward on the annular sealing ring, and; a connecting portion connecting the gasket shoulder to the annular ring, wherein the annular sealing ring, the connecting portion, and the gasket shoulder define a channel, the channel in fluid communication with the interior cavity.

A method of joining two pipe lengths includes obtaining a piping element assembly, the piping element assembly comprising a coupling body, the coupling body comprising an outer shell extending between a first end and a second end of the coupling body, the outer shell defining an axial direction extending from the first end to the second end and a radial direction extending orthogonally from the axial direction, an inner shell defining an interior cavity, a first bore defined in the first end and communicating with the interior cavity, and a second bore defined in the second end and communicating with the interior cavity; at least one gasket disposed within the interior cavity, each gasket comprising a gasket shoulder contacting the inner shell of the coupling body, an annular sealing ring including a sealing surface disposed radially inward on the annular sealing ring and adapted to seal against an outer surface of one pipe length, and a connecting portion connecting the gasket shoulder to the annular ring, wherein the annular sealing ring, the connecting portion, and the gasket shoulder define a channel, the channel in fluid communication with the interior cavity; arranging one pipe length such that an end of the pipe length is in alignment with the first bore; inserting the one pipe length into the first bore, whereby the annular sealing ring contacts an outer surface of the pipe length; and, inserting the other pipe length into the second bore, whereby the annular sealing ring contacts an outer surface of the other pipe length.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
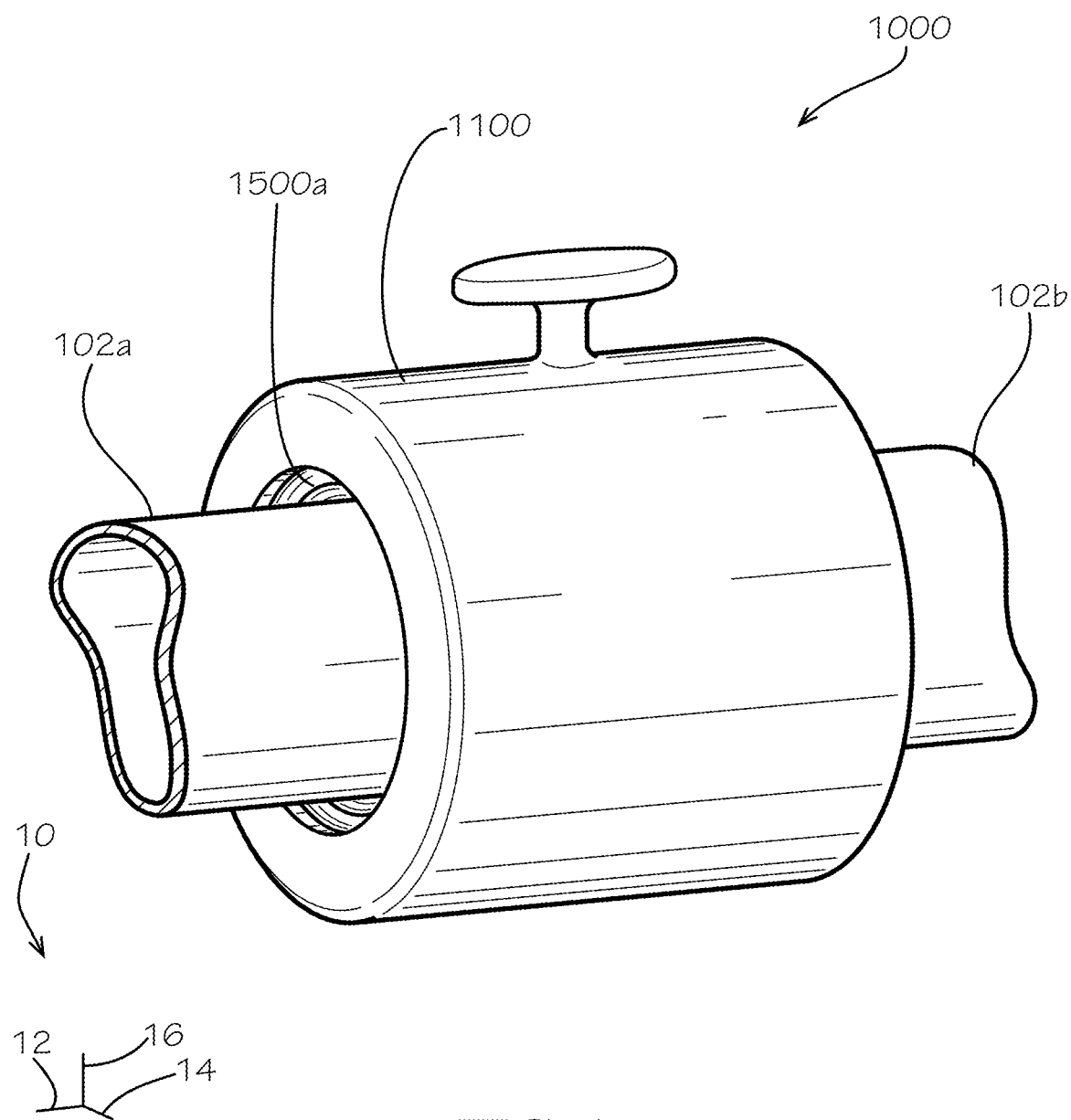
FIG. 1 is a perspective view of a piping element assembly in connection with two pipe lengths in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a piping element assembly and associated methods, systems, devices, parts, and various apparatus. The piping element assembly can comprise at least one gasket. It would be understood by one of skill in the art that the disclosed piping element assembly is described in but a few exemplary aspects among many. No particular terminology or description should be considered limiting on the disclosure or the scope of any claims issuing therefrom.

A piping element assembly 1000 is disclosed and described in FIG. 1. The piping element assembly 1000 can comprise a wide-range coupling capable of joining pipe lengths of various sizes with various manufacturing tolerances and/or with various materials. Pipe lengths as referred to in this disclosure would be understood by one of skill in the art and can include round piping, tubing, or various connecting elements used in various fluid products applications. One of skill in the art would understand that the term "pipe lengths" is not intended to limit the scope of the disclosure and could include any and all types of fluid containment or transportation implements. The piping element assembly 1000 can effectively seal two pipe lengths with minimal manufacturing effort.

Figure 8:
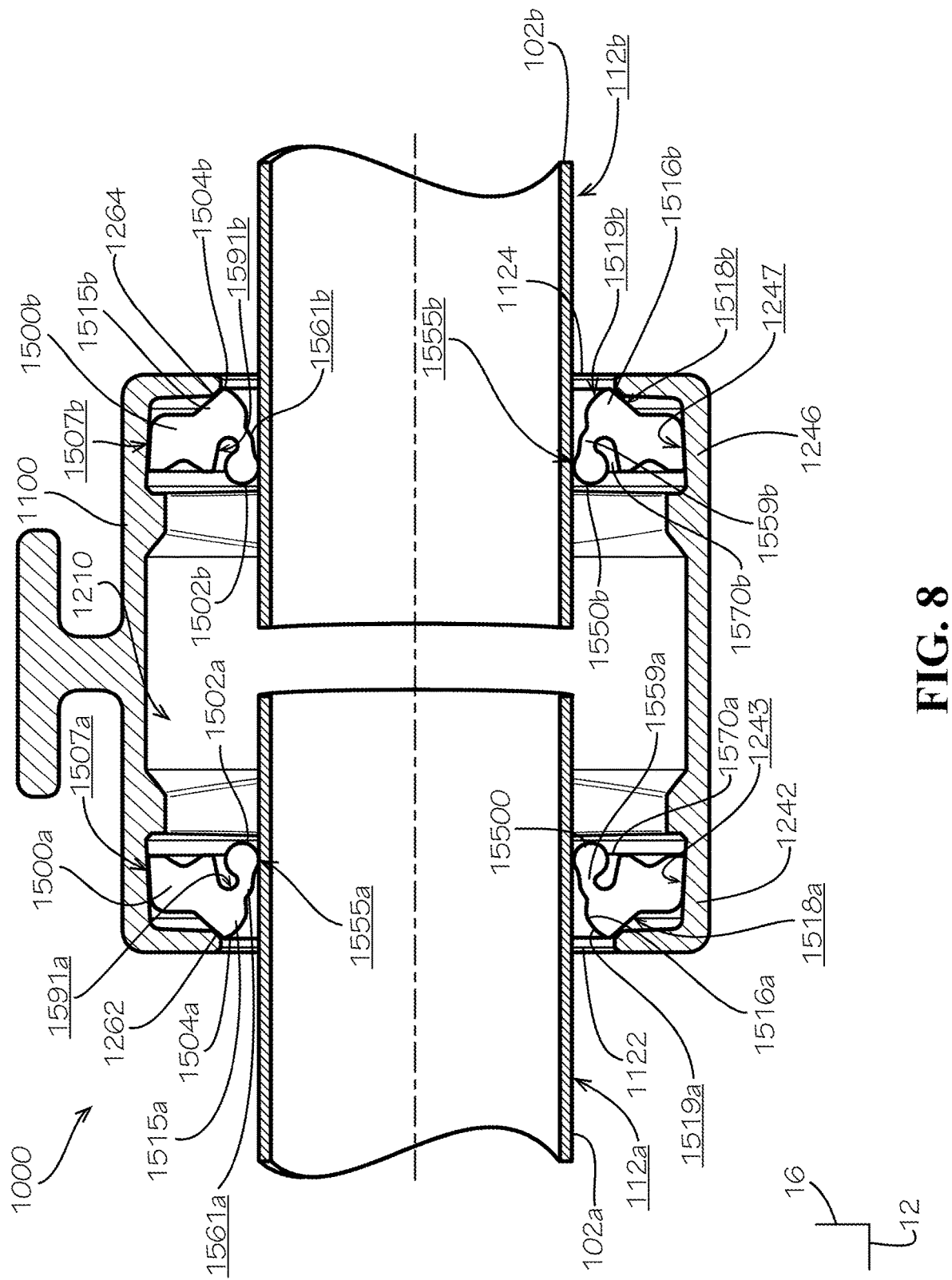
FIG. 8 is a cutaway side view of the piping element assembly in connection with two pipe lengths as indicated with reference to FIG. 1.

The piping element assembly 1000 can comprise a coupling body 1100, a first gasket 1500a, and a second gasket 1500b (shown in FIG. 8). The piping element assembly 1000 can be coupled to a first pipe length 102a and a second pipe length 102b. A cardinal orientation axis 10 is shown in FIG. 1 and can comprise an x-axis 12, a y-axis 14, and a z-axis 16. In various aspects, the x-axis 12 can be co-linear with various aspects of the various piping features and can be aligned with axes of couplings, gaskets, and pipe lengths as described within this disclosure. As can be seen with reference to FIG. 1, the x-axis 12 is generally aligned in a horizontal arrangement and intended to be parallel to a ground plane along which the piping element assembly 1000 might be aligned. The y-axis 14 is orthogonal to the x-axis 12 and also generally aligned in horizontal arrangement and intended to be parallel to a ground plane along which the piping element assembly 1000 might be aligned. Finally, the z-axis 16 is arranged orthogonally to the x-axis 12 and the y-axis 14 and generally aligned in vertical arrangement and intended to be orthogonal to a ground plane along which the piping element assembly 1000 might be aligned. Although ground planes are referenced in this definition of the cardinal orientation axis 10, the reference is by intention only, and reference to the x-axis 12, y-axis 14, and z-axis 16 within the disclosure will define the arrangement of features, parts, and apparatus of the piping element assembly 1000 in relation to each other. The ground plane should be considered incidental to the arrangement of the other parts of the piping element assembly 1000.

Figure 2:
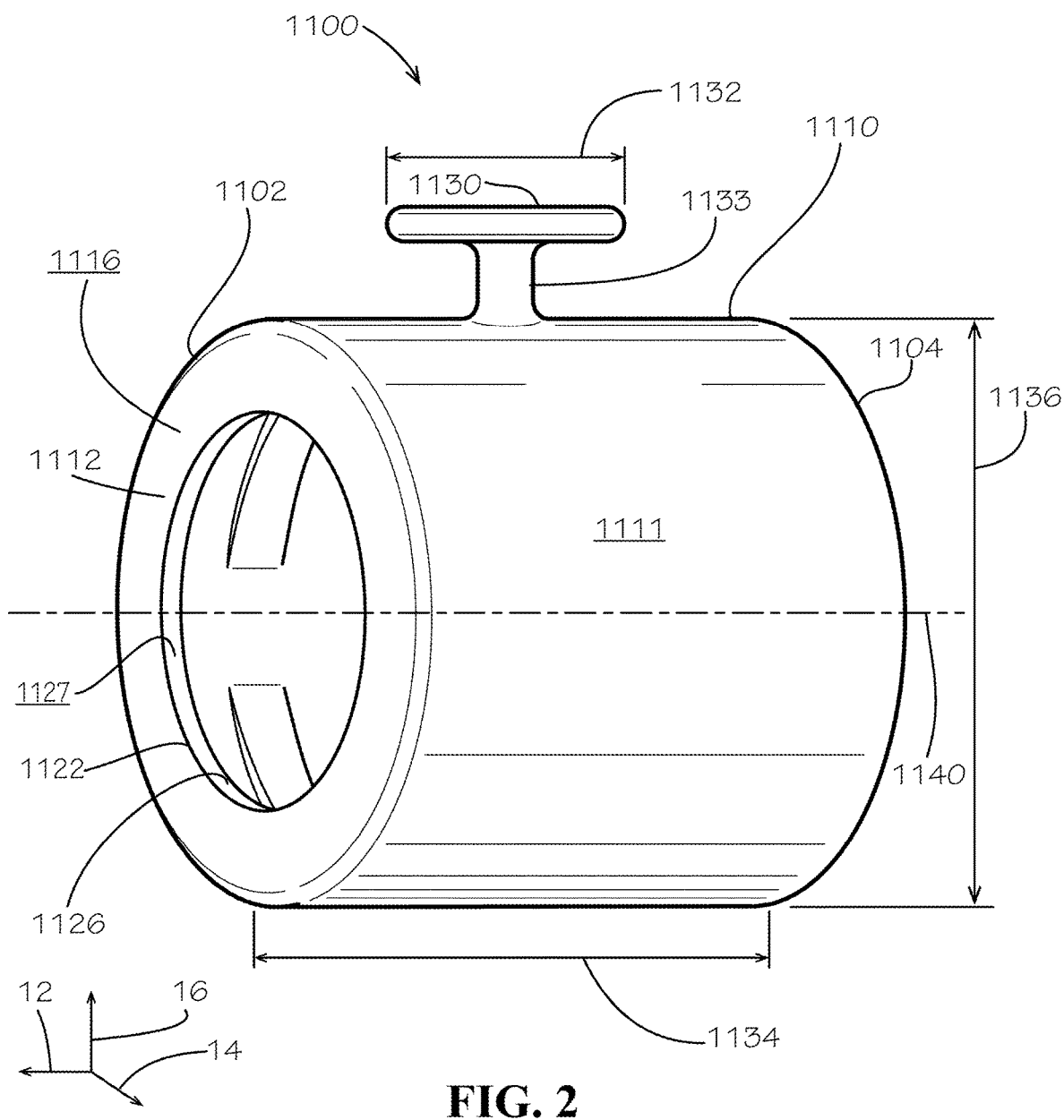
FIG. 2 is a perspective view of a coupling body of the piping element assembly of FIG. 1.

As seen with reference to FIG. 2, a coupling body 1100 can comprise an annular outer shell 1110. The outer shell 1110 can define an outer surface 1111 of the coupling body 1100. The coupling body 1100 can comprise a first end 1102 and a second end 1104. The first end 1102 can comprise a facing wall 1112 and the second end 1104 can comprise a facing wall 1114 (shown in FIG. 3). The facing walls 1112, 1114 in the current aspect can each be an annular disc. Each facing wall 1112, 1114 can comprise an outer surface 1116, 1118 (shown in FIG. 3). Each facing wall 1112, 1114 can define a bore 1122, 1124 (shown in FIG. 3). Each bore 1122, 1124 can be of about the same diameter. For reference, the piping element assembly 1000 can be utilized on piping systems having 4-inch diameter piping. As such, each bore 1122, 1124 can be slightly larger than four inches. In the current aspect, the diameter of each bore 1122, 1124 can be about 5.5 inches. In various aspects the diameter can be greater than 6 inches. In various aspects, the diameter can be smaller than 5 inches. Because each facing wall 1112, 1114 can be of a thickness, a shear facing 1126, 1128 (shown in FIG. 3) can be seen. The shear facings 1126, 1128 can comprise shear surfaces 1127, 1129 (shown in FIG. 3).

Also seen with reference to FIG. 2 is a handle 1130. The handle 1130 can comprise a length 1132 as measured parallel to the x-axis 12 of about 3.7 inches, for example and without limitation. The handle 1130 can be elevated from the surface 1111 by a stanchion 1133. The stanchion 1133 connects the handle 1130 to the coupling body 1100. The stanchion 1133 in the current aspect can be, for example and without limitation, about one to two inches in length and can comprise various fillets and radiuses to avoid sharp edges. Additionally, the handle 1130 can be of a thickness of about ½ inch to about 1 inch, for example and without limitation. In various aspects, these features can be of various shapes and sizes, and the measurements listed herein should not be considered limiting on the scope of the disclosure.

The coupling body 1100 can comprise a length 1134 that can be about 8 inches and an outer diameter 1136 that can be about 8.3 inches in the current aspect, although various aspects may comprise various lengths, diameters, and other measurements. A coupling body axis 1140 can be seen as an axis of rotation of the coupling body 1100. In various aspects, the coupling body axis 1140 can be aligned with and/or parallel to the x-axis 12. In the current aspect, the coupling body 1100 can be coaxial with bores 1122, 1124 such that the coupling body axis 1140 can be an axis of the radial elements of the coupling body 1100. In various aspects, the coupling body axis 1140 can also define a general flow direction of water through the coupling body 1100, although such arrangements will be discussed in greater detail in other places within this disclosure.

Figure 3:
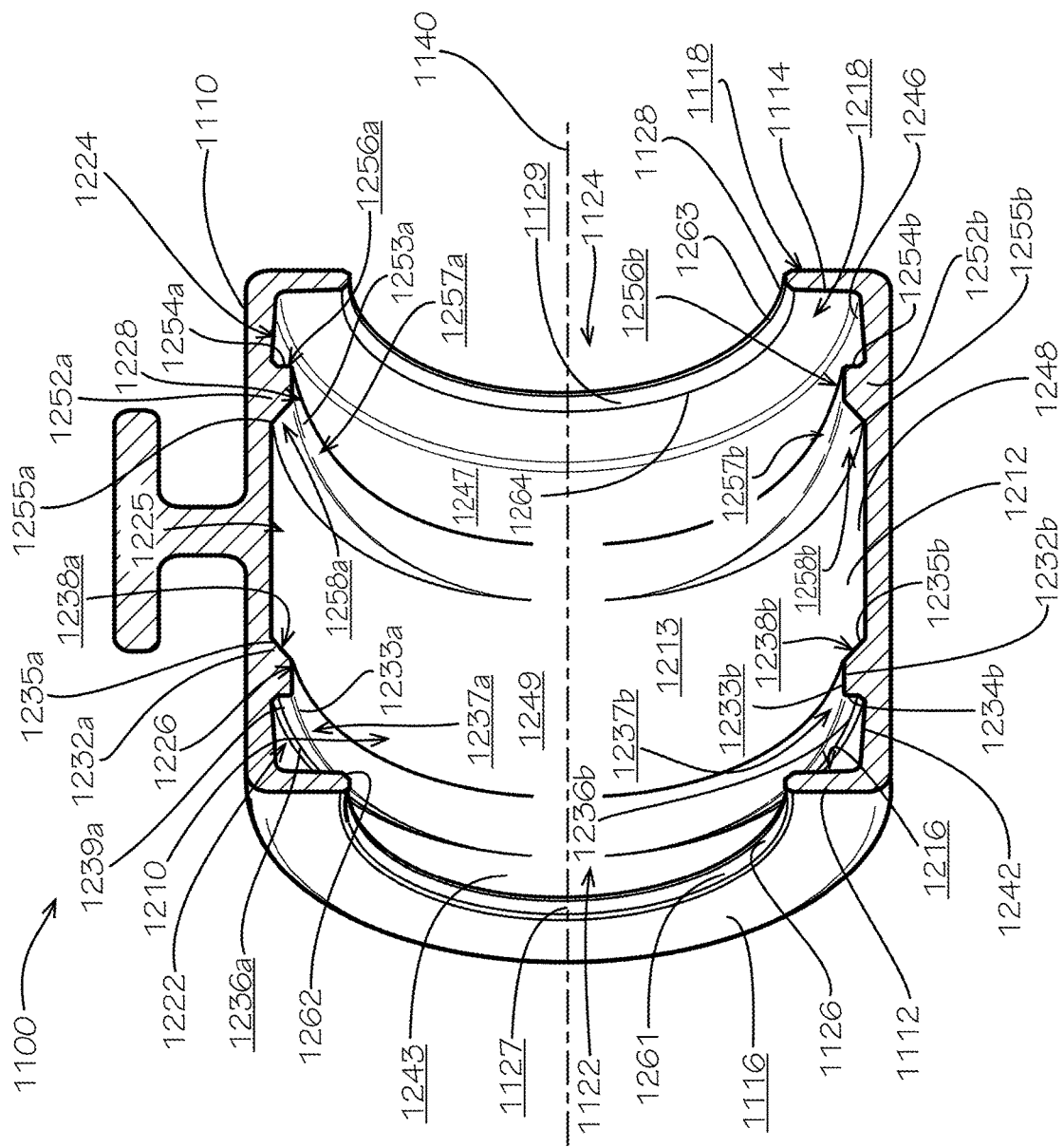
FIG. 3 is a cutaway perspective view of the coupling body of FIG. 2 taken along an x-axis or an axial direction.
Figure 4:
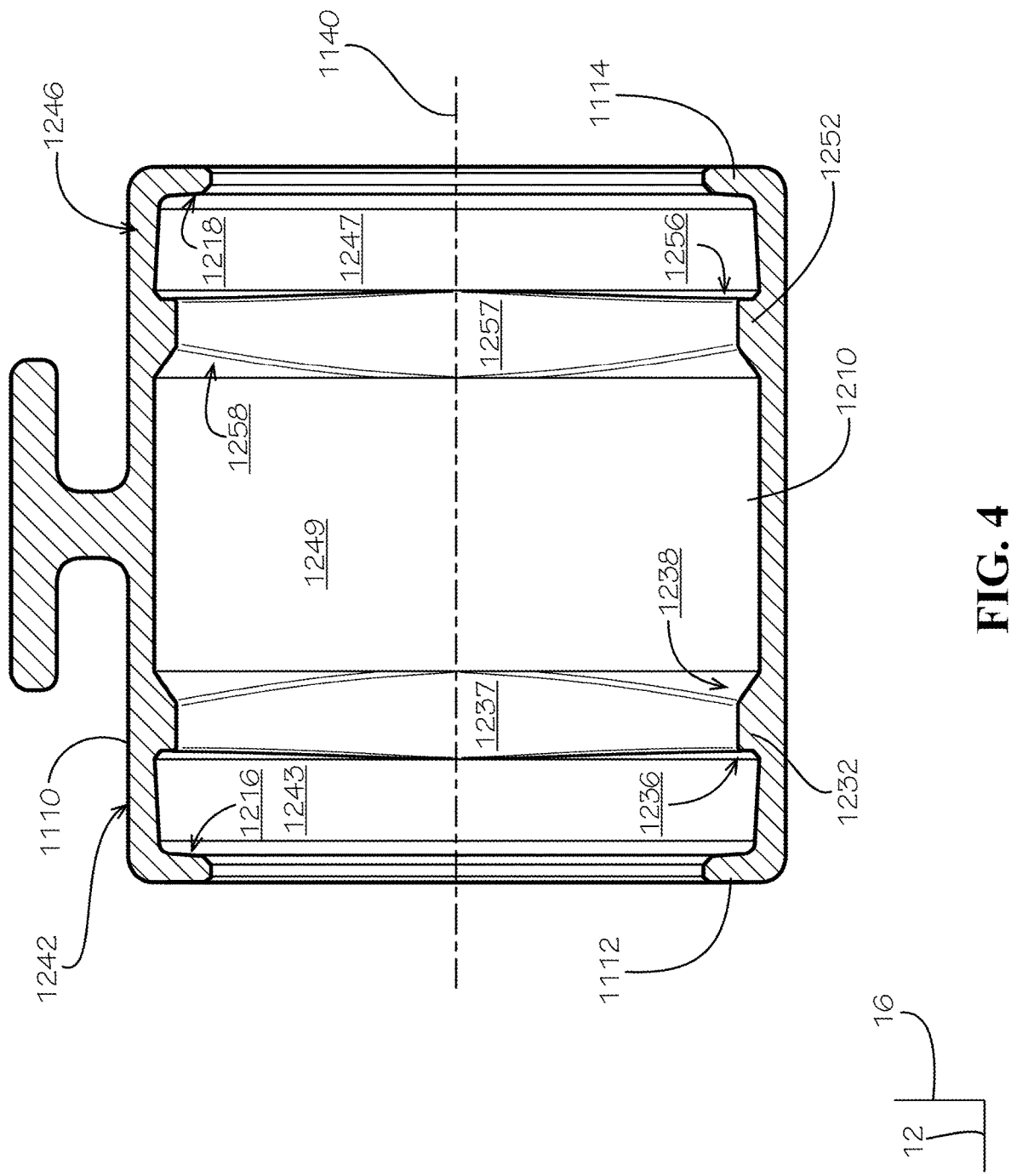
FIG. 4 is a cutaway side view of the coupling body of FIG. 2 taken along an x-axis or an axial direction.

As seen with reference to FIGS. 3-4, the coupling body 1100 can comprise an inner shell 1212 that can be annular and generally follow the outer shell 1110 in shape. The inner shell 1212 can define an inner surface 1213. Each facing wall 1112, 1114 can comprise an inner surface 1216, 1218.

The coupling body 1100 can define an interior cavity 1210 that can be the area within the enclosure of the coupling body 1100. The interior cavity 1210 can be defined generally by the inner shell 1212 and in the current aspect can comprise various portions as defined by features of the inner shell 1212.

A first gasket engagement portion 1222 and a second gasket engagement portion 1224 of the interior cavity 1210 can be seen. The interior cavity 1210 can also comprise a central portion 1225, a first shoulder portion 1226 and a second shoulder portion 1228.

As can be seen, a first shoulder 1232 and a second shoulder 1252 can be features of the inner shell 1212. An upper portion of the first shoulder 1232 can be denoted as 1232a and a lower portion of the first shoulder 1232 can be denoted as 1232b in the current aspect. An upper portion of the second shoulder 1252 can be denoted as 1252a and a lower portion of the second shoulder 1252 can be denoted as 1252b in the current aspect. One of skill in the art would understand that features of each upper portion 1232a,1252a can be substantially similar to features of each lower portion 1232b,1252b, respectively, such that discussion of various features can be coordinating between the various elements. Both the first shoulder 1232 and the second shoulder 1252 in the current aspect can be substantially annular with profiles gradually modifying along the circumference of the coupling body 1100. In the current aspect, each shoulder 1232, 1252 can be thickest at opposing points and thinnest at coordinating points. The gradual thickening and thinning of the profiles of the shoulders 1232,1252 can assist with assembly of the piping element assembly 1000 by allowing a pathway for the gasket 1500 to be assembled into the coupling body 1100.

Each shoulder 1232a,b, 1252a,b can comprise a radial wall 1234a,b and 1254a,b. each radial wall 1234a,b, 1254a,b can comprise a radial surface 1236a,b, 1256a,b, respectively. Each shoulder 1232a,b, 1252a,b can comprise an axial wall 1233a,b, 1253a,b which can comprise an axial surface 1237a,b, 1257a,b. Each shoulder 1232a,b, 1252a,b can comprise a slope wall 1235a,b, 1255a,b which can comprise a slope surface 1238a,b, 1258a,b. Other parts of the inner shell 1212 can comprise a first gasket region 1242, a second gasket region 1246, and a central region 1248. The first gasket region 1242 can comprise a first gasket region surface 1243, the second gasket region 1246 can comprise a second gasket region surface 1247, and the central region 1248 can comprise a central region surface 1249.

Each shear facing 1126,1128 can comprise an axial region 1261,1263, respectively. Each shear facing 1126,1128 can comprise a chamfer 1262,1264, respectively As seen with specific reference to FIG. 4, the first gasket region 1242 and the second gasket region 1246 each define a sloping surface such that a thickness of the coupling body 1100 as measured from the outer shell 1110 to the inner shell 1210 is variable along the coupling body axis 1140. Generally, the thickness can be greater proximate each facing wall 1112, 1114, and the thickness can reduce along the coupling body axis 1140 until the beginning of each shoulder 1232, 1252.

Figure 5B:
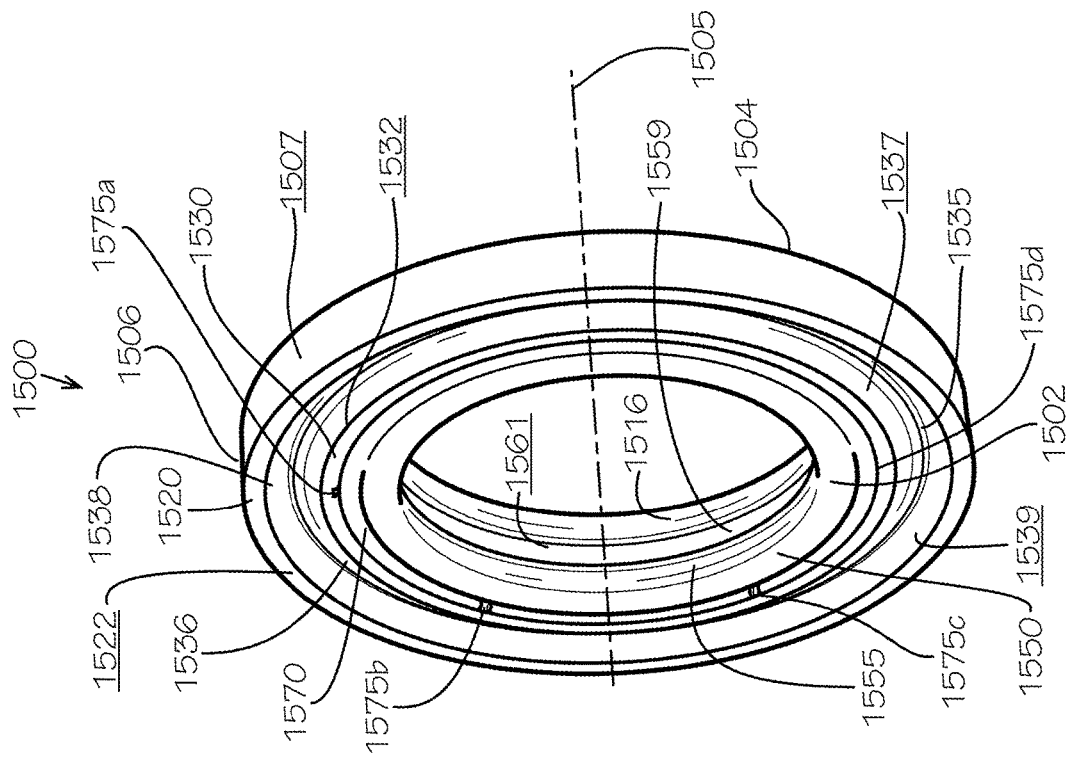
FIG. 5B is a second perspective view of a gasket of the piping element assembly of FIG. 1.
Figure 5A:
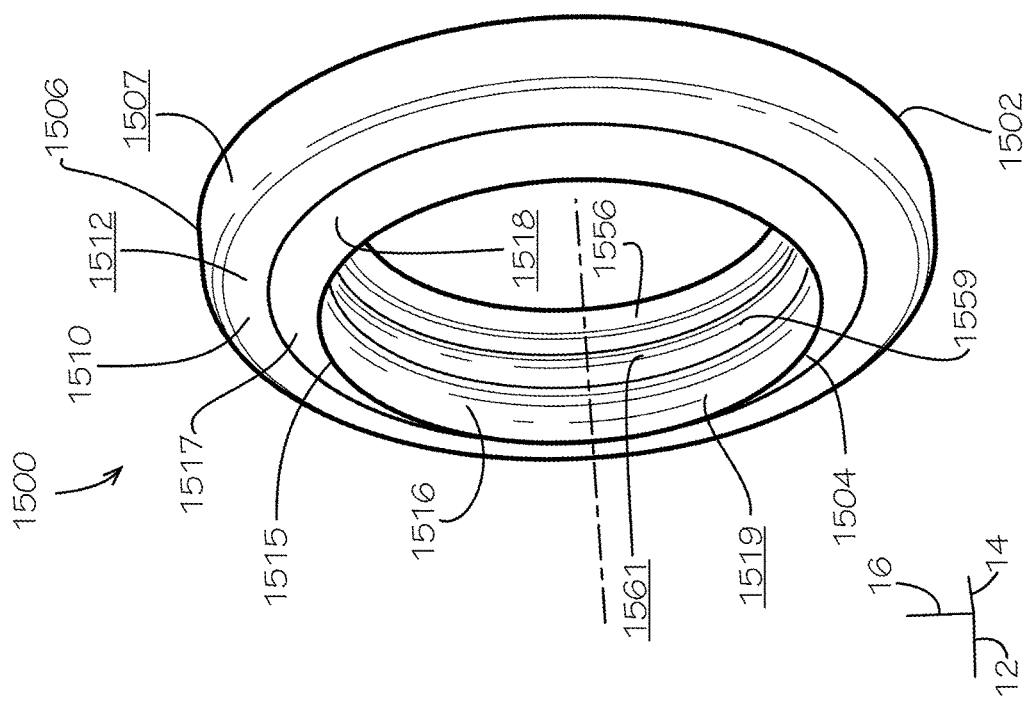
FIG. 5A is a perspective view of a gasket of the piping element assembly of FIG. 1.

As seen with reference to FIGS. 5A-5B, the gasket 1500 can be seen from each side. As the gaskets 1500 of the current aspect can be annular, the views of FIGS. 5A-5B provide views of the features. The view of FIG. 5A displays an outer facing portion of the gasket 1500 and the view of FIG. 5B displays an inner facing portion of the gasket 1500.

The gasket 1500 can comprise an inner end 1502 and an outer end 1504 as measured along an axis 1505 of the gasket 1500. The gasket 1500 can comprise an outer end 1506 that can define an engagement surface 1507. The engagement surface 1507 in the current aspect can be angled substantially to match a profile of the coupling body 1100 when assembled, as will be discussed in further detail elsewhere in this disclosure. The gasket 1500 can comprise an outer axial face 1510 that can be substantially planar. The outer axial face 1510 can define an axial surface 1512. The gasket 1500 can comprise an extrusion prevention feature, and, in the current aspect, the extrusion prevention feature can be an annular protrusion 1515. The annular protrusion 1515 can be defined by a slope 1517 along a radially outward portion of the annular protrusion 1515 and a radius portion 1516 along a radially inward portion of the annular protrusion 1515. The slope 1517 can define a slope surface 1518 and the radius portion 1516 can define a radius surface 1519.

The gasket 1500 can comprise an interior axial face 1520 that can itself define an axial surface 1522. The gasket 1500 can comprise a second interior axial face 1530 with an axial surface 1532 radially inward from the interior axial face 1520. A groove 1535 can be defined between a radially inward end of the interior axial face 1520 and a radially outward end of the second interior axial face 1530. The groove 1535 can be defined be a first slope 1536 and a second slope 1538 that can be substantially conical and arranged to define the groove 1535. The first slope 1536 can comprise a surface 1537 and the second slope 1538 can comprise a surface 1539. In the current aspect, the first slope 1536 and the second slope 1538 can define generally frustoconical shapes arranged in opposing directions. As such, the groove 1535 can be annular in the region defined by the frustoconical shapes.

The gasket 1500 can comprise an annular sealing ring 1550. The annular sealing ring 1550 of the current aspect can be substantially circular in cross-section. The annular sealing ring 1550 can comprise an engagement surface 1555 along a radially inward end of the annular sealing ring 1550. A connecting region 1559 can connect the sealing ring 1550 to the annular protrusion 1515. Together, the connecting region 1559, the sealing ring 1550, and the annular protrusion 1515 can define a radially inner surface 1561 of the gasket 1500.

A channel 1570 can be defined between the second interior axial face 1530 and the annular sealing ring 1550. The channel 1570 will be discussed in greater detail with reference to additional figures. The gasket 1500 of the current aspect can define a plurality of leak pathways 1575 (seen in the view of FIG. 5B are 1575a,b,c,d). In the current aspect, six leak pathways 1575 can be defined.

Figure 6:
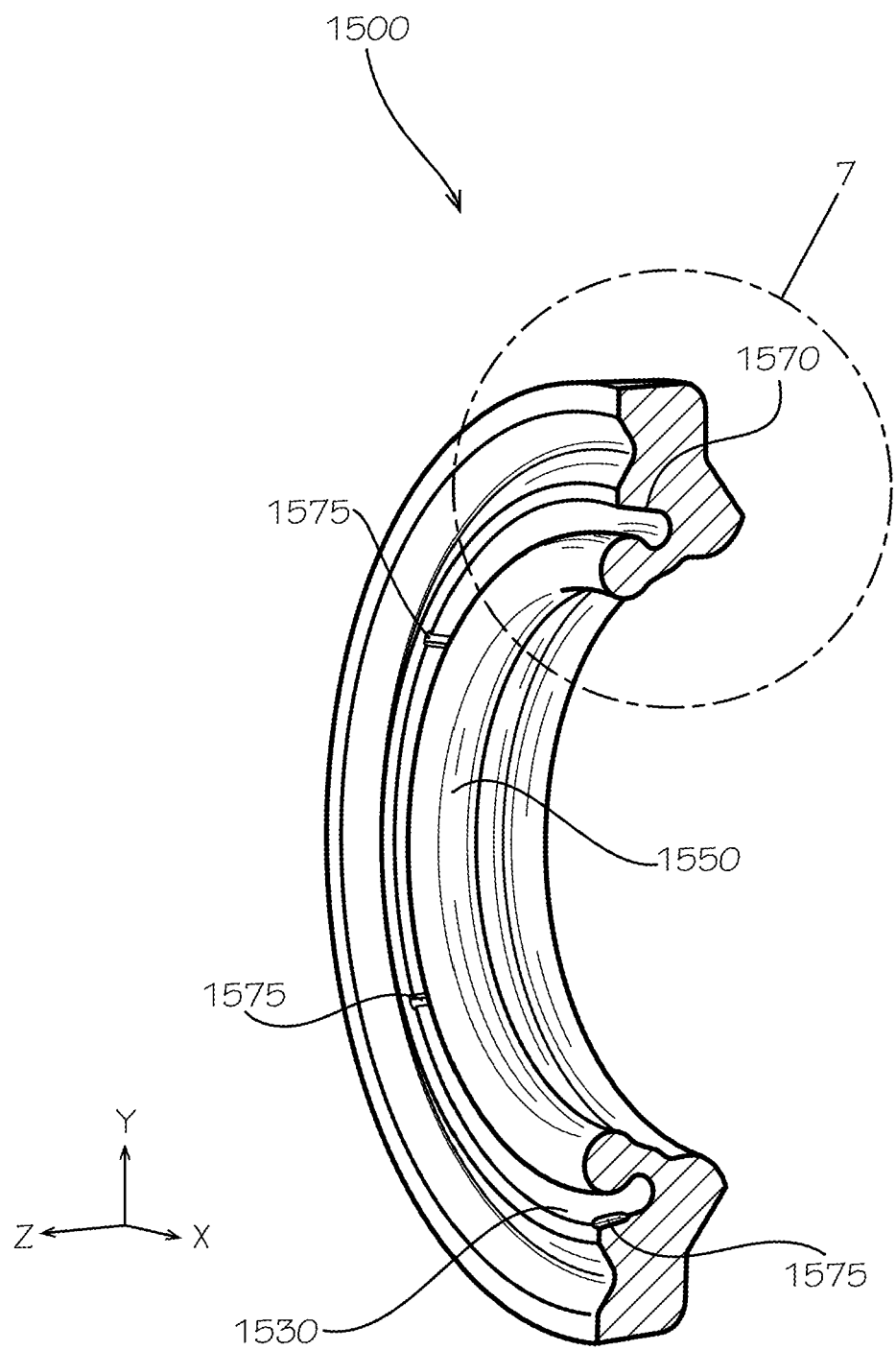
FIG. 6 is a cutaway perspective view of the gasket of FIG. 5B.

As seen with reference to FIG. 6, the channel 1570 can be disposed between the second interior axial face 1530 and the annular sealing ring 1550 and can provide a pathway for water to travel axially behind the annular sealing ring 1550. A connecting region 1559 can be disposed between and connecting the annular sealing ring 1550 and the annular protrusion 1515. The channel 1570 can be defined partially by the annular sealing ring 1550, partially by the connecting region 1559, partially by the annular protrusion 1515, and partially by portions of the gasket 1500 defining the second interior axial face 1530.

Figure 7:
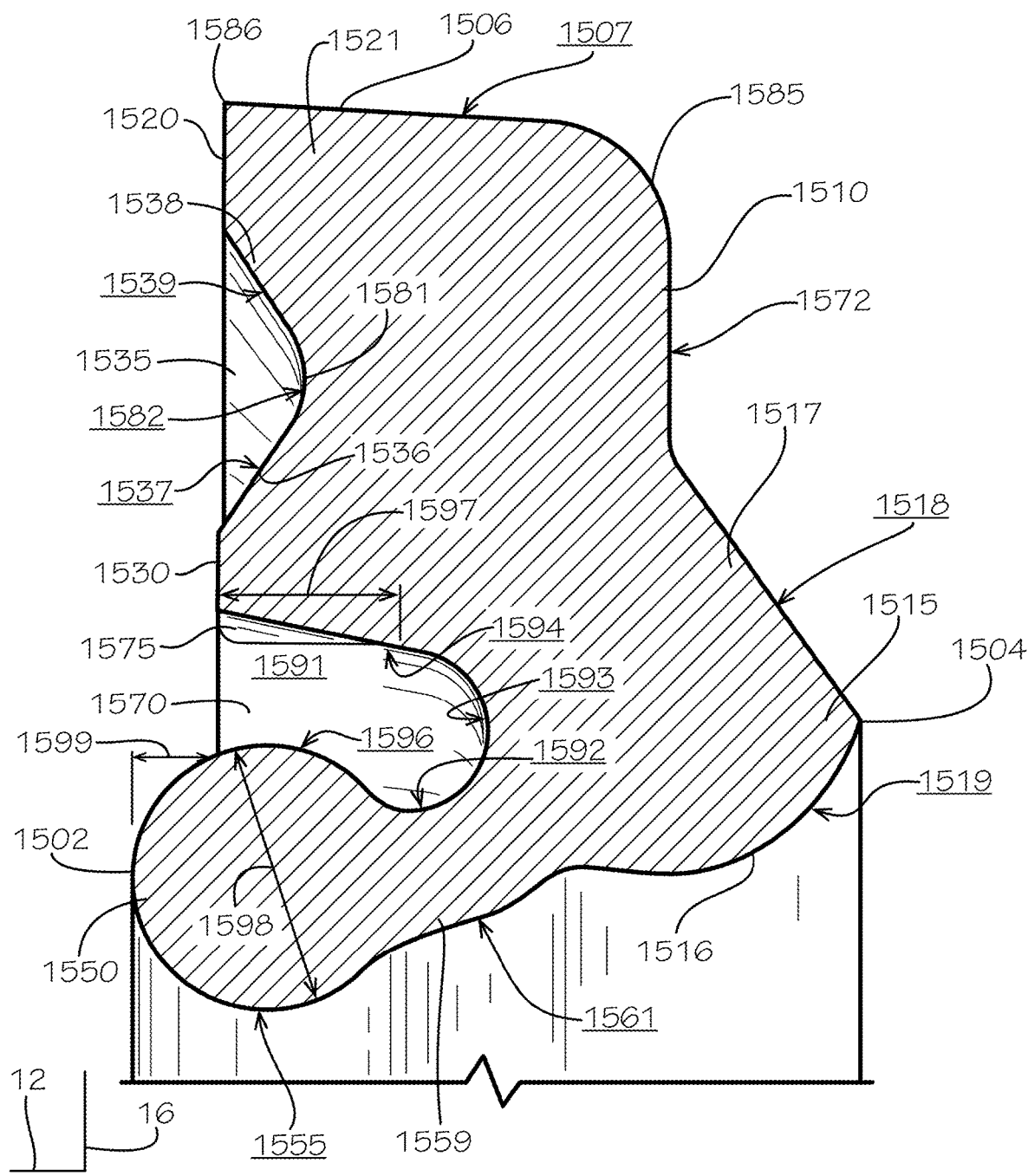
FIG. 7 is a detail view of the Detail 7 as annotated in FIG. 6.

As seen with reference to FIG. 7, the groove 1535 can be defined by the first slope 1536 and the second slope 1538 as previously mentioned. In the current aspect, a radius 1581 can connect the first slope 1536 to the second slope 1538, and a radius surface 1582 can further define the groove 1535. The gasket 1500 can define a radius corner 1585 connecting the outer axial face 1510 to the outer end 1506. The gasket 1500 can define a radial-most end point 1586 which can be a point in cross-section and rotated about the axis 1505.

The channel 1570 can comprise a channel surface 1591. The channel surface 1591 can comprise multiple surface portions. A connection membrane portion 1592 can be defined along the channel 1570 at an area proximate the connecting region 1559 and generally opposite the radially inner surface 1561. Adjacent the connection membrane portion 1592 can be a rear face portion 1593. A radially outward portion 1594 can define the channel 1570 from the rear face portion 1593 to the axial end of the channel 1570 proximate the second interior axial face 1530. Each leak pathway 1575 in the current aspect can be defined within the radially outward portion 1594. A sealing ring portion 1596 can define the remaining portion of the channel surface 1591 opposite the radially outward portion 1594. The interior axial face 1520 can be defined by a gasket shoulder 1521.

As can be seen, the leak pathway 1575 defines a groove or channel that extends into the channel 1570 by a distance 1597. Also, a diameter 1598 of the annular sealing ring 1550 can be seen and can be a diametral measurement of the annular sealing ring 1550 if the annular sealing ring 1550 were not attached to the connecting region 1559. The distance 1597 can be selected such that the leak pathway 1575 extends beyond the annular sealing ring 1550 and connects to the channel 1570 even if the sealing ring portion 1596 of the channel surface 1591 annular sealing ring 1550 were to become in contact with or engaged with the radially outward portion 1594 of the channel surface 1591. As such, the leak pathway 1575 can provide a fluid path to ensure pressure consistency within the channel 1570 even when the gasket 1500 extrudes or changes shape. Also, it should be noted by one of skill in the art that the annular sealing ring 1550 in the current aspect can extend axially beyond the second interior axial face 1530 by a distance 1599. In the current aspect, the distance 1599 can be less than a radius of the annular sealing ring 1550, which would be half of the diameter 1598.

The gasket 1500 can be made of various materials including but not limited to various rubbers, sealants, glues, membranes, and resins. One of skill in the art would understand that municipal water applications exert extreme pressures—which can exceed several hundred pounds per square inch (psi)—and considerations in selecting materials for the gasket 1500 can comprise durability, malleability, and sealing characteristics, among others. An appropriate material can be selected that is capable of withstanding pressures of municipal water systems without extruding but with appropriate sealing against leakage.

The piping element assembly 1000 can be assembled by arranging two gaskets 1500a,b within the coupling body 1100 as seen with reference to FIG. 8. Each gasket 1500a,b can be inserted within the coupling body 1100 and arranged so that each inner end 1502a,b can face toward the interior cavity 1210. An outer end 1504a,b of each gasket 1500a,b can be arranged within the bores 1122, 1124. Each slope surface 1518a,b can be arranged in contact with the chamfer 1262, 1264. Each engagement surface 1507a,b can be arranged in contact with a gasket region surface 1243,1247.

Each gasket 1500a,b can be arranged to receive pipe length 102a,b. The engagement surface 1555a,b of each gasket 1500a,b can contact and engage an outer surface 112a,b of the pipe length 102a,b in sealing arrangement. Under municipal water pressure, the channel 1570a,b can be arranged to fill with water. Pressure applied to the channel surface 1591a,b can cause force to be applied that can aide the annular sealing ring 1550a,b in sealing against the pipe length 102a,b.

Pressure applied within the interior cavity 1210 can also force the gasket 1500a,b axially outward. In such arrangement, the sloping alignment of the gasket regions 1242, 1246 of the coupling body 1100 can force the engagement surface 1507a,b into tighter engagement with the gasket region surface 1243,1247. Additionally, the annular protrusion 1515a,b can be forced further into the bore 1122,1124 and cause additional sealing of the connecting region 1559a,b along radially inner surface 1561a,b against outer surface 112a,b, and if forced further, the radius surface 1519 of the radius portion 1516 can seal against outer surface 112a,b. The annular protrusion 1515a,b can also help prevent extrusion of the gasket 1500 through the space between the pipe length 102a,b and the bore 1122,1124, which can cause failure of the gasket 1500 and leaking of the piping element assembly 1000 in application.

As can be observed by one of skill in the art, pressure within the interior cavity 1210 can have the effect of forcing all portions of the gasket 1500a,b axially outward, including the annular sealing ring 1550. The channel 1570 can be of particular importance in preventing the annular sealing ring 1550 from extruding out between the pipe length 102 and the coupling body 1100. In particular, water pressure applied to connection membrane portion 1592 and sealing ring portion 1596 of the channel surface 1591 can provide back pressure, effectively equalizing the axial pressure on the annular sealing ring 1550. As a result, the channel 1570 can be of particular importance in certain aspects to hold the gasket 1500 in place and keep effective sealing of the pipe element assembly 1000. Additionally, the leak pathways 1575 can be of particular importance to reduce the chance of a pressure differential occurring within the channel 1570 as compared to the interior cavity 1210.

Figure 9:
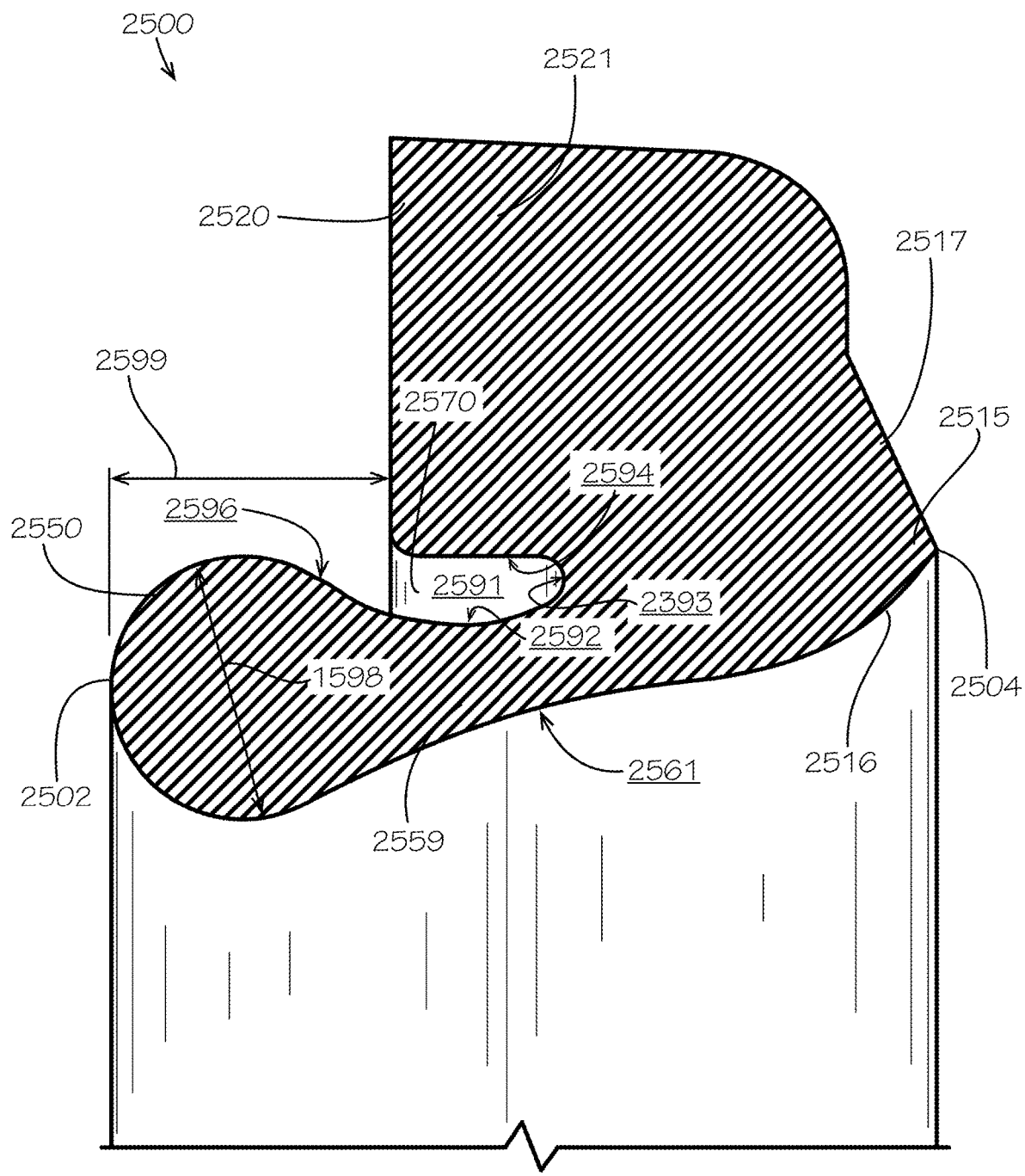
FIG. 9 is a detail view of a gasket in accord with another aspect of the current disclosure.

Another aspect of a gasket 2500 can be seen with reference to FIG. 9. Elements similarly drawn between various aspects within the disclosure would be understood by one of skill in the art to be of similar physical arrangement. The gasket 2500 can comprise features similar to gasket 1500. An annular protrusion 2515 can comprise a slope portion 2517 and a radius portion 2516. The gasket 2500 can comprise an axial face 2520 as can be defined by a gasket shoulder 2521. Unlike gasket 1500, in the current aspect, the gasket 2500 does not define a groove or channel defined in the gasket shoulder 2521, although various aspects can define various grooves or channels. The gasket 2500 can comprise an inner end 2502 and an outer end 2504.

The gasket 2500 can define a channel 2570 arranged between the axial face 2520 and an annular sealing ring 2550. The annual sealing ring 2550 can define a diameter 1598. The gasket 2500 can comprise a connecting region 2559 that can define a radially inward surface 2561.

The channel 2570 can define a channel surface 2591 that can comprise various portions. A connection membrane portion 2592 can be defined along the channel 2570 at an area proximate the connecting region 2559 and generally opposite the radially inner surface 2561. Adjacent the connection membrane portion 2592 can be a rear face portion 2593. A radially outward portion 2594 can define the channel 2570 from the rear face portion 2593 to the axial end of the channel 2570 proximate the interior axial face 2520. A sealing ring back surface 2596 can define the remaining portion of the channel surface 2591 along a mouth of the channel 2570. The sealing ring back surface 2596 can comprise portions outside the channel 2570 and thus not included within the definition of the channel surface 2591 in the current aspect. Various aspects can comprise various arrangements.

As previously mentioned with respect to leak pathways 1575, back pressure can be an important element in preventing gasket pull-out when in-field. The arrangement of the annular sealing ring 2550—including sealing ring back surface 2596—can help prevent failure of the gasket 2500. In particular, sealing ring back surface 2596 can provide a surface for water pressure to be applied that can create back pressure on the annular sealing ring 2550. The back pressure can help equalize axial forces on the annular sealing ring 2550 to help prevent axial motion of portions of the gasket 2500.

Figure 10:
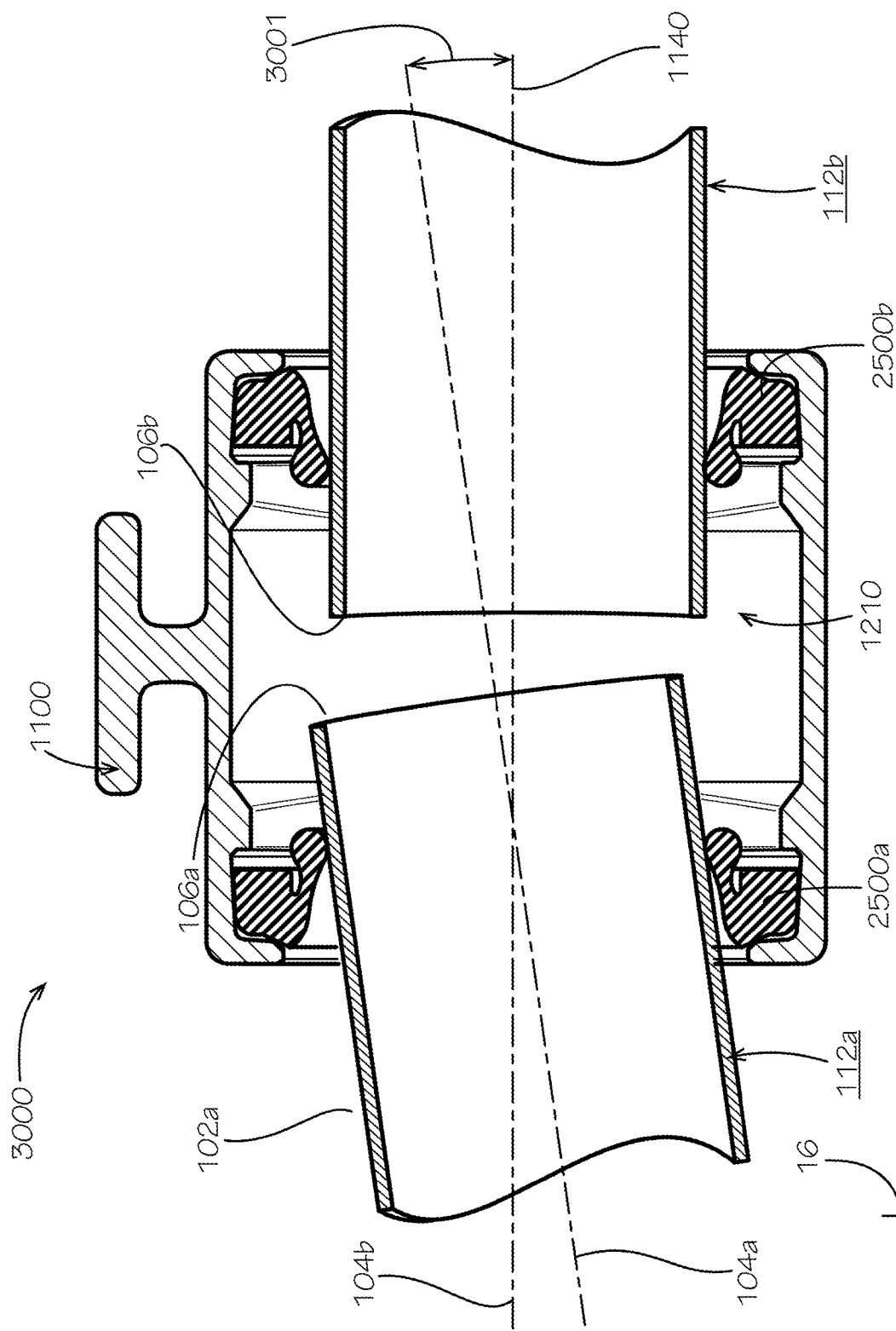
FIG. 10 is a cutaway side view of a piping element assembly including the gasket of FIG. 9 arranged on pipe lengths having an angle of deflection in accord with one aspect of the current disclosure.

A pipe element assembly 3000 can comprise gasket 2500a,b along with coupling body 1100 in arrangement as similarly described with reference to pipe element assembly 1000. As seen in FIG. 10, pipe lengths 102a,b define axes 104a,b. One advantage that can be included in the various aspects of the current disclosure is the ability to arrange pipe lengths 102a,b such that the various axes 104a,b can be arranged at an angle of deflection 3001. In various aspects, one of the axes 104a,b can be arranged collinearly with the coupling body axis 1140, although the axes 102a,b need not be collinear with the coupling body axis 1140. In various aspects of the pipe element assembly 1000,3000, pipe lengths 102a,b can be arranged at angles of deflection 3001 of up to 4°. In various aspects of the pipe element assembly 1000,3000, pipe lengths 102a,b can be arranged at angles of deflection 3001 of up to 5°. In various aspects of the pipe element assembly 1000,3000, pipe lengths 102a,b can be arranged at angles of deflection 3001 of up 10°. In the various arrangements and aspects, pipe element assemblies 1000,3000 of the current disclosure can maintain sealed engagement of the pipe lengths 102a,b even under high municipal water pressure ratings and even when arranged at angles of deflection 3001 cited above.

It should be noted by one of skill in the art that the annular sealing ring 2550 in the current aspect can extend axially beyond the interior axial face 2520 by a distance 2599 (shown in FIG. 9). In the current aspect, the distance 2599 can be greater than the diameter 1598 of the annular sealing ring 2550. As such, an entirety of the annular sealing ring 2550 can extend beyond the reach of the channel 2570. As previously mentioned, back pressure can help equalize forces on the annular sealing ring 2550 to prevent axial motion of the annular sealing ring 2550 and to maintain suitable sealing against the pipe length 102. Because the annular sealing ring 2550 extends beyond the channel 2570, there can be little risk of the annular sealing ring 2550 becoming sealably affixed to the channel 2570 and isolating the channel 2570 from communication with the interior cavity 1210. As a result, back pressure on the annular sealing ring 2550 can be maintained even if the gasket 2500 is deformed or extruded in various positions. As such, in the current aspect, the gasket 2500 can omit leak pathways from the channel 2570, although various aspects can reintroduce leak pathways if needed.

In use, a pipe element assembly 1000,3000 can be assembled into a municipal piping system according to the following procedure, although various method steps can be implemented or omitted as would by understood by one of skill in the art. In the field, the piping element assembly 1000,3000 can be used to join pipe lengths 102 for various reasons. In various applications, the piping element assembly 1000,3000 can be utilized to create an angle of deflection allowing two pipe lengths 102a,b to be arranged at an angle. In various applications, the piping element assembly 1000, 3000 can be utilized to repair pipe that has become broken or otherwise needs a joint to repair. In various applications, the piping element assembly 1000,3000 can be utilized to extend piping lengths across long spans where single piping units would not be long enough to cover the span and, as such, multiple pipe lengths 102 can be joined to cover the span.

In typical application, the piping element assembly 1000, 3000 can be buried as part of an underground municipal piping system, although the piping element assembly 1000, 3000 need not be included in that type of system. In the field, two pipe lengths 102a,b can be selected to be joined. In general, it can be of benefit to arrange the first pipe length 102a in the desired arrangement with respect to the second pipe length 102b, although this step can be omitted.

To attach the piping element assembly 1000,3000 to join the pipe lengths 102a,b, the first pipe length 102a can be arranged adjacent to end 1102 or end 1104 of the coupling body 1100. An end 106a of the pipe length 102a can be inserted into the bore 1122 or bore 1124 of the coupling body 1100. The end 106a can travel through the first gasket 1500a or the first gasket 2500a such that at least the engagement surface 1555a contacts the pipe length 102a along the outer surface 112a. The piping element assembly 1000,3000 can then be slid over the end of the first pipe length 102a for a selected length so that the other end 1104 or end 1102 of the coupling body passes the end 106b of the second pipe length 102b. This can provide clearance to allow the first pipe length 102a with the piping element assembly 1000,3000 to be arranged in the desired position with respect to the second pipe length 102b for coupling with the piping element assembly 1000,3000. In various aspects, the end 106b can contact or, in some aspects, pass through the second gasket 1500b or second gasket 2500b. The second pipe length 102b can then be arranged proximate the other bore 1124 or bore 1122 (if not already arranged as such), and the coupling body 1100 can be slid back over such that the second gasket 1500b or the second gasket 2500b can contact an outer surface 112b of the second pipe length 102b. As such, one gasket 1500a or gasket 2500a can contact one pipe length 102a and one gasket 1500b or gasket 2500b can contact another pipe length 102b with the ends 106a,b disposed within the interior cavity 1210.

When water is released into the system and water pressure builds, water can fill the interior cavity 1210. Because surfaces within the coupling body 1100 and surfaces of the gaskets 1500,2500 can be symmetrical, pressure differentials are not seen in the current system, and pullout force is not exerted on the piping element assembly 1000,3000 generally—although pressure force can be exerted on specific elements such as the gaskets 1500,2500 and on the coupling body 1100 as a pressure vessel. As such, the piping element assembly 1000,3000 can be arranged without special tools and can effectively couple municipal pipe lengths without the need for sealing elements or fasteners.

Additionally, the piping element assembly 1000,3000 can effectively couple piping of various materials even though measured outer diameters of those piping lengths may vary. By way of non-limiting example only, for piping classified as 4-inch diameter, steel pipe can have an outer diameter of about 4.5 inches while ductile iron pipe can have an outer diameter of about 4.8-4.9 inches. The piping element assembly 1000,3000 can effectively join pipe lengths within a piping classification regardless of material.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A slip-on piping element assembly for coupling two pipe lengths, the piping element assembly comprising:
    a coupling body, the coupling body comprising
        an outer shell extending between a first end and a second end of the coupling body, the outer shell defining an axial direction extending from the first end to the second end and a radial direction extending orthogonally from the axial direction,
        an inner shell defining an interior cavity,
        a first bore defined in the first end and communicating with the interior cavity, and
        a second bore defined in the second end and communicating with the interior cavity;
    a gasket disposed within the interior cavity, the gasket comprising
        a gasket shoulder contacting the inner shell of the coupling body,
        an annular sealing ring defining a sealing surface disposed radially inward on the annular sealing ring and adapted to seal against an outer surface of one pipe length, the annular sealing ring being about circular in cross-section and defining a diameter, and
        a connecting portion connecting the gasket shoulder to the annular ring,
        wherein the annular sealing ring, the connecting portion, and the gasket shoulder define a channel, the channel in fluid communication with the interior cavity,
        wherein the gasket comprises an end proximate to the interior cavity and an end distal to the interior cavity, wherein the annular sealing ring defines the end proximate to the interior cavity,
        wherein an annular protrusion is connected to the connecting portion and to the gasket shoulder, wherein the annular protrusion defines the end distal to the interior cavity, and
        wherein the annular protrusion comprises a slope portion radially proximate to the gasket shoulder and a radius portion radially distal to the gasket shoulder, wherein the end distal to the interior cavity is defined at an intersection of the slope portion and the radius portion.

2. The piping element assembly of claim 1, wherein the channel defines a channel surface, and wherein the channel surface defines at least one leak pathway in fluid communication with the interior cavity.

3. The piping element assembly of claim 1, wherein an axis of one pipe length is arranged at an angle of deflection with respect to an axis of the other pipe length, and wherein the piping element assembly does not include fasteners.

4. The piping element assembly of claim 3, wherein the angle of deflection is up to 4°.

5. The piping element assembly of claim 3, wherein the angle of deflection is up to 5°.

6. The piping element assembly of claim 3, wherein the angle of deflection is up to 10°.

7. The piping element assembly of claim 1, wherein the annular sealing ring defines a bore.

8. A gasket comprising:
a gasket shoulder, the gasket shoulder defining a radial gasket end;
an annular sealing ring defining a sealing surface disposed radially inward on the annular sealing ring, the annular sealing ring being about circular in cross-section and defining a diameter;
a connecting portion connecting the gasket shoulder to the annular ring; and,
an annular protrusion, the annular protrusion connected to the connecting portion and to the gasket shoulder, the annular protrusion defining a first axial gasket end and the annular sealing ring defining a second axial gasket end,
wherein the annular sealing ring, the connecting portion, and the gasket shoulder define a channel,
wherein the annular protrusion comprises a slope portion radially proximate to the gasket shoulder and a radius portion radially distal to the gasket shoulder, wherein the first axial gasket end is defined at an intersection of the slope portion and the radius portion, the radius portion defining a radius surface that is curved.

9. The gasket of claim 8, wherein the gasket shoulder comprises an interior axial face, the interior axial face being a positive distance from the second axial gasket end as measured axially away from the first axial gasket end, the distance being less than the diameter.

10. The gasket of claim 8, wherein the gasket shoulder comprises an interior axial face, the interior axial face being a positive distance from the second axial gasket end as measured axially away from the first axial gasket end, the distance being greater than the diameter.

11. The gasket of claim 8, wherein the channel defines a channel surface, wherein the channel surface defines at least one leak pathway in fluid communication with an interior cavity.

12. The gasket of claim 8, wherein the annular sealing ring defines a bore.

13. A method of joining two pipe lengths, the method comprising:
obtaining a piping element assembly, the piping element assembly comprising
a coupling body, the coupling body comprising
an outer shell extending between a first end and a second end of the coupling body, the outer shell defining an axial direction extending from the first end to the second end and a radial direction extending orthogonally from the axial direction,
an inner shell defining an interior cavity,
a first bore defined in the first end and communicating with the interior cavity, and
a second bore defined in the second end and communicating with the interior cavity;
a gasket disposed within the interior cavity, the gasket comprising
a gasket shoulder contacting the inner shell of the coupling body,
an annular sealing ring defining a sealing surface disposed radially inward on the annular sealing ring and adapted to seal against an outer surface of one pipe length, the annular sealing ring being about circular in cross-section and defining a diameter, and
a connecting portion connecting the gasket shoulder to the annular ring,
wherein the annular sealing ring, the connecting portion, and the gasket shoulder define a channel, the channel in fluid communication with the interior cavity, and wherein the piping element assembly does not include fasteners;
arranging one pipe length such that an end of the pipe length is in alignment with the first bore;
inserting the one pipe length into the first bore, whereby the annular sealing ring contacts an outer surface of the pipe length;
arranging the piping element assembly on the one pipe length at a position further than a desired location of engagement;
arranging the other pipe length such that an end of the other pipe length is in alignment with the second bore, and
inserting the other pipe length into the second bore, whereby the annular sealing ring contacts an outer surface of the other pipe length,
wherein at least a portion of the gasket is extruded between the piping element and one pipe length.

14. A slip-on piping element assembly for coupling two pipe lengths, the piping element assembly comprising:
a coupling body, the coupling body comprising
an outer shell extending between a first end and a second end of the coupling body, the outer shell defining an axial direction extending from the first end to the second end and a radial direction extending orthogonally from the axial direction,
an inner shell defining an interior cavity,
a first bore defined in the first end and communicating with the interior cavity, and
a second bore defined in the second end and communicating with the interior cavity;
a gasket disposed within the interior cavity, the gasket comprising
a gasket shoulder contacting the inner shell of the coupling body,
an annular sealing ring defining a sealing surface disposed radially inward on the annular sealing ring and adapted to seal against an outer surface of one pipe length, the annular sealing ring being about circular in cross-section and defining a diameter, and
a connecting portion connecting the gasket shoulder to the annular ring,
wherein the annular sealing ring, the connecting portion, and the gasket shoulder define a channel, the channel in fluid communication with the interior cavity, and wherein an axis of one pipe length is arranged at an angle of deflection with respect to an axis of the other pipe length, and wherein the piping element assembly does not include fasteners.

15. The piping element assembly of claim 14, wherein the angle of deflection is up to 4°.

16. The piping element assembly of claim 14, wherein the angle of deflection is up to 5°.

17. The piping element assembly of claim 14, wherein the angle of deflection is up to 10°.

* * * * *